Patented Mar. 27, 1923.

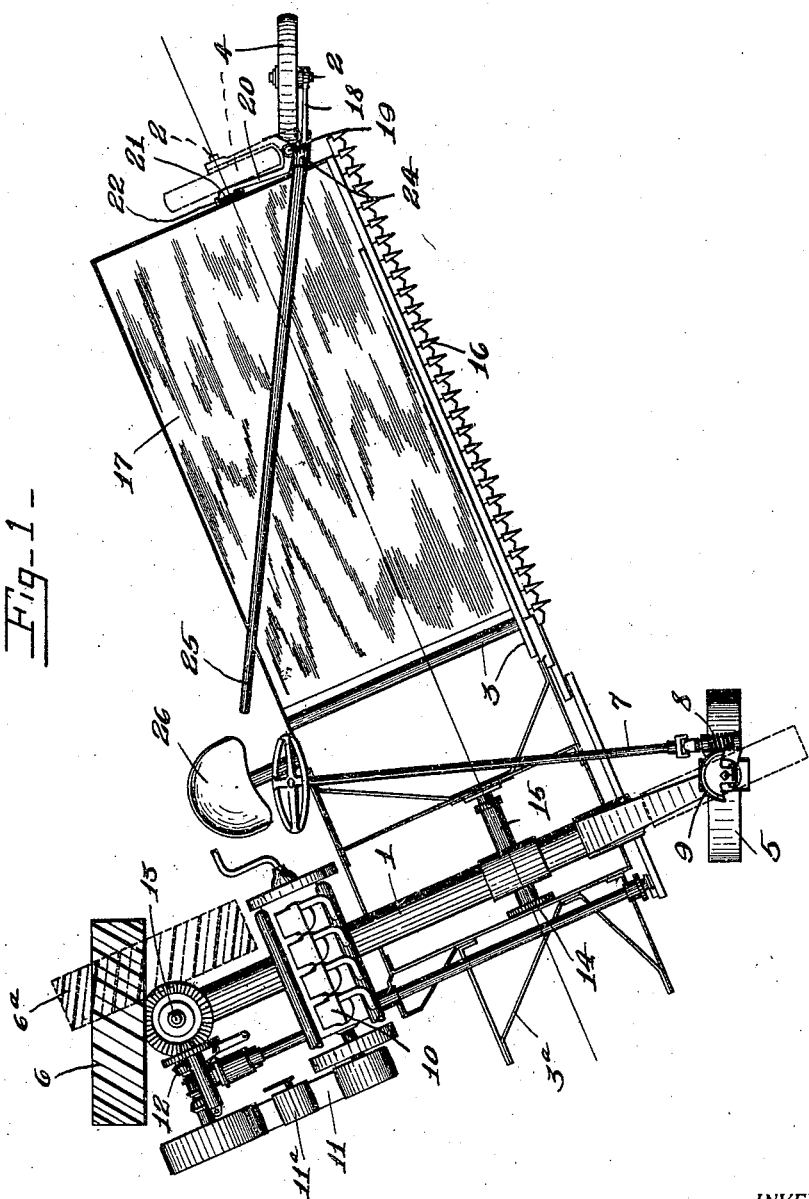

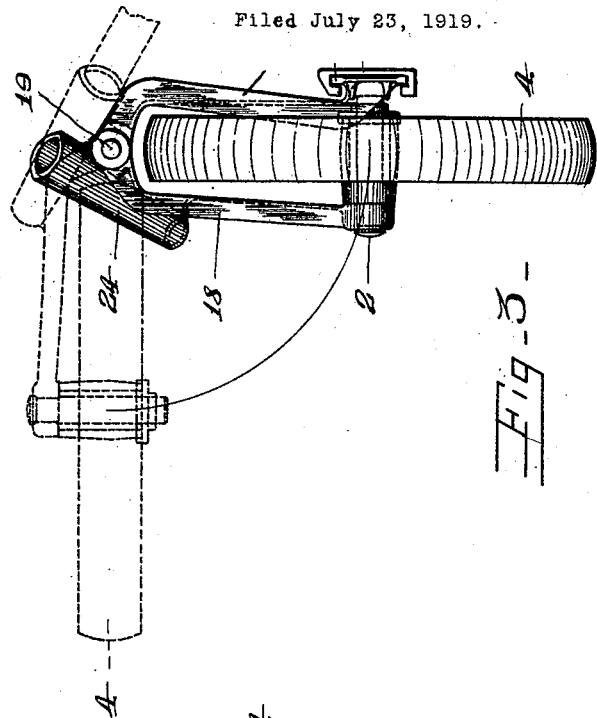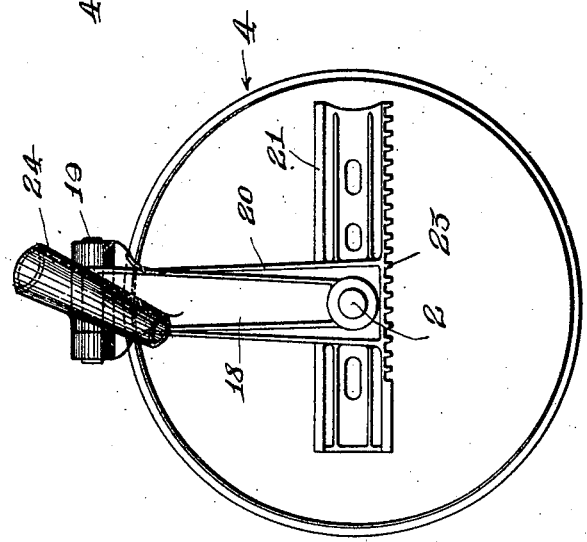

1,449,648

UNITED STATES PATENT OFFICE.

ALEXANDER T. BROWN AND CHARLES S. BROWN, OF SYRACUSE, NEW YORK.

MOTOR AGRICULTURAL MACHINE.

Application filed July 23, 1919. Serial No. 312,721.

*To all whom it may concern:*

Be it known that we, ALEXANDER T. BROWN and CHARLES S. BROWN, citizens of the United States, and residents of Syracuse, in the county of Onondaga and State of New York, have invented a certain new and useful Motor Agricultural Machine, of which the following is a specification.

This invention relates to motor agricultural machines and has for its object means by which the machine can be moved under its own power laterally or sidewise, which means is particularly simple in construction and highly efficient and durable in use. The invention consists in the novel features and in the combinations hereinafter set forth and claimed.

In describing this invention, reference is had to the accompanying drawings in which like characters designate corresponding parts in all the views.

Figure 1 is a plan view of one form of an agricultural machine embodying our invention, of the tractor, steering and caster wheels being shown in their positions occupied when the caster wheel is utilized as a steering wheel and the position occupied by these parts in the normal use of the machine being indicated in dotted lines.

Figure 2 is an elevation of the caster wheel and contiguous parts.

Figure 3 is a plan view of parts seen in Fig. 2, the position of the caster wheel when castering and when being utilized as a steering wheel being shown in dotted lines.

We have here shown our invention as embodied in a binder and 1 designates the main frame of the tractor propelling chassis having steering and tractor wheels at its opposite ends.

3 designates the binder frame mounted on the main frame, crosswise thereof and having a caster wheel 4 at its outer side.

As machines of this type are wide compared with their length and take up the greater portion of the road so that especially on narrow roads it is impossible to pass other vehicles, our invention relates to means whereby the binder can be driven sidewisely especially when traveling along a road or through gates, but it is also equally adaptable for positioning the binder when in the field.

The steering wheel 5 in the illustrated embodiment of our invention, is provided at the front end of the main frame 1, and the tractor wheel 6 at the rear end thereof, the steering wheel being manually operable into different angular positions relatively to the normal line of travel by means of a steering shaft 7 connected to the fork of the steering wheel in any suitable manner as by a worm 8 and worm gear 9. The tractor wheel is driven by the motor 10 mounted on the main frame 1, through suitable power transmitting means including the belt 11 and belt tightener 11ª and the gearing 12 and is shiftable into different angular positions about an upright axis 13, one of which is indicated at 6ª, Fig. 1, this shifting being effected in any suitable manner as in Patent No. 1,247,073, dated Nov. 20, 1917.

When the binder is being driven sidewise the tractor wheel 6 is shifted into a position substantially parallel to the angular position in which the steering wheel 5 is adjusted by hand.

The frame 3 of the binder, as will be understood by those skilled in the art, is provided with an axle 14 on which the main ground wheel of the animal or tractor drawn binder frame is mounted, this axle being in line with the axis of the caster wheel 4; and in applying the standard binder to the tractor frame 1 said tractor frame is provided with a transverse bearing 15 arranged to receive the axle 14 and displace the ground wheel usually mounted on the axle 14.

The tractor frame and the means by which the binder frame is supported thereon forms the subject matter of another application.

The binder frame 3, as will be understood by those skilled in the art, supports the cutting mechanism 16 including the finger bar and knife, movable apron 17 on which the cut grain falls and by which it is conveyed to another apron or carrier which carries it to bundling and tieing mechanism mounted on the portion 3ª of the frame.

The caster wheel 4 is provided with means by which it is convertible into a manually operated steering wheel when the tractor wheel 6 and steering wheel 5 are arranged in angular positions relatively to the normal line or travel of the machine, that is, when these wheels are arranged to cause the machine to travel sidewise.

As here shown the caster wheel is mounted on a spindle 2 carried by a horizontally swinging arm 18 hinged or pivoted at 19 to an arm 20 normally fixed at its other end to a portion of the frame 3 of the binder.

As seen in Figs. 2 and 3, the arm 20 is carried by a slide 21 on which the guide 22 fixed to the frame of the machine moves vertically. The slide has gear teeth 23 with which a worm pinion, not shown, meshes, the pinion being rotatable by a suitable tool for raising and lowering the frame of the binder relatively to the axis of the caster wheel. This feature forms no part of this invention and is standard to binder construction. The axle 14 is fixed to a slide on which moves a guide fixed to the frame, similar to standard makes of horse drawn binders.

The arms 18 and 20 form a fork in which the caster wheel 4 normally extends when the machine is traveling in a straight line.

Owing to the arrangement of the arms 18, 20 and the axis or spindle 2 of the caster wheel, there is no sidewise binding of the slide 21 in the guide when the caster wheel is in its normal position.

When castering, the arm 18 swings on its pivot 19 and when used as a steering wheel the arm 18 and wheel 4 are swung into the position shown in dotted lines in Figs. 1 and 3.

The means by which the caster wheel is operated as a steering wheel includes a socket 24 mounted on the arm 18 and arranged to receive a tiller pole 25 which, when the caster wheel is positioned to be used as a steering wheel, extends within reach of the seat 26 of the binder.

In operation, when it is desired to move the binder sidewise, the steering wheel 5 is turned into an angular position by turning the steering rod 7 and is locked in such position as the worm 8 and spiral gear 9 are self locking.

The tractor wheel 6 is also turned and held in an angular position by suitable means such as described in our Patent No. 1,247,073, dated Nov. 20, 1917, and during the movement of the binder sidewise it can be steered by means of the caster wheel 4 and tiller pole 25.

What we claim is:

1. In an agricultural machine, a frame, steering and tractor wheels supporting the frame, and a caster wheel at one side of the frame, the steering and tractor wheels being shiftable into positions at an angle to the normal line of travel of the machine, and means for operating the caster wheel as a steering wheel when the steering wheel and tractor wheels are in angular positions, substantially as and for the purpose described.

2. In an agricultural machine, a main frame, having a steering wheel at one end, a tractor wheel at its other end shiftable about an upright axis into an angular position parallel to an angular position into which the steering wheel is shiftable, an implement frame supported by the main frame and having a caster wheel at one side, and means for operating the caster wheel as a steering wheel, substantially as and for the purpose specified.

3. In an agricultural machine, a main frame having a steering wheel at its front end and a tractor wheel at its rear end, said wheels being shiftable into angular positions relatively to the normal line of travel of the frame, an implement comprising a frame mounted on the main frame and having a caster wheel at its outer side, and means for manually operating the caster wheel to operate the same when the steering wheel and tractor wheel are set in angular positions, substantially as and for the purpose set forth.

4. An agricultural machine having a caster wheel, a support for the caster wheel comprising a fork including a horizontally extending arm, and a second horizontally extending arm pivoted to the first arm and carrying a spindle at its free end on which the caster wheel is mounted, said arm being movable freely on its pivot, substantially as and for the purpose set forth.

5. An agricultural machine having a caster wheel, a support for the caster wheel comprising a fork including a fixed horizontally extending arm, and a second horizontally extending arm pivoted to the first arm and carrying a spindle at its free end on which the caster wheel is mounted, and means for manually moving the second arm on its pivot to operate the caster wheel as a steering wheel, substantially as and for the purpose described.

6. In an agricultural machine, a frame, front and rear wheels supporting the main frame and shiftable in angular positions relatively to the normal line of travel, a wheel at one side of the frame, and means for operating the last mentioned wheel as a steering wheel, when the front and rear wheels are set in angular positions, substantially as and for the purpose specified.

7. An agricultural machine having a caster wheel, a support for the caster wheel comprising a fork including a fixed horizontally extending arm, and a second horizontally extending arm pivoted to the first arm and carrying a spindle at its free end on which the caster wheel is mounted, and means for moving the second arm on its pivot to operate the caster wheel as a steering wheel, the fixed arm having a socket for receiving and supporting the end of the spindle, substantially as and for the purpose specified.

8. In an agricultural machine, three supporting ground wheels, two of such wheels being arranged one behind the other, and the third wheel normally traveling in a line parallel to said two wheels and such third wheel being a caster wheel, said two wheels being movable into a position whereby they travel in parallel paths, and means for operating the third or caster wheel when the two former wheels are arranged in position to travel in parallel paths, substantially as and for the purpose described.

In testimony whereof, we have hereunto signed our names at Syracuse, in the county of Onondaga and State of New York, this 24th day of June, 1919.

ALEXANDER T. BROWN.
CHAS. S. BROWN.